United States Patent [19]

Davis

[11] Patent Number: 5,660,667

[45] Date of Patent: Aug. 26, 1997

[54] METHOD OF COATING SURFACES USING APPLIQUÉS OF CONSTANT GAUSSIAN CURVATURE

[75] Inventor: Keith J. Davis, Seattle, Wash.

[73] Assignee: The Boeing Company, Seattle, Wash.

[21] Appl. No.: 477,736

[22] Filed: Jun. 7, 1995

[51] Int. Cl.$^6$ ................................................ B29B 11/06
[52] U.S. Cl. ................ 156/245; 156/242; 156/297; 156/324.4
[58] Field of Search ................... 156/71, 212, 214, 156/215, 242, 245, 264, 265, 297, 324.4, 350; 244/120, 121, 123, 130; 428/914

[56] References Cited

U.S. PATENT DOCUMENTS

| | | | |
|---|---|---|---|
| 3,065,940 | 11/1962 | Eckstein | 244/130 |
| 4,683,800 | 8/1987 | Snedeker . | |
| 4,986,496 | 1/1991 | Marentic et al. . | |
| 5,008,140 | 4/1991 | Schmertz . | |
| 5,106,439 | 4/1992 | Wellings et al. | 156/350 |
| 5,318,251 | 6/1994 | Bergh | 244/121 |
| 5,448,687 | 9/1995 | Hoogerhyde et al. . | |
| 5,556,491 | 9/1996 | Servanty et al. . | |

OTHER PUBLICATIONS

McGraw–Hill Encyclopedia of Science & Technology, vol. 18, 7th Edition, 1992, p. 10.

*Primary Examiner*—Michael W. Ball
*Assistant Examiner*—Richard Crispino
*Attorney, Agent, or Firm*—John C. Hammar

[57] ABSTRACT

Ever more stringent environmental restrictions make it ever more challenging to apply coatings by conventional processes like spray painting because of the volatile solvents and hazardous pigments. The present invention is an alternative for applying a coating precisely on a surface. In the method of the invention, we apply appliqués of constant Gaussian curvature to the corresponding areas of comparable curvature. We make the appliqués on a family of molds of different Gaussian curvature and thereby avoid making a "splash" mold of the surface of interest to create the appliqués or encountering the ridges, creases, or gaps that otherwise occur with attempts to cover the surface with flat (planar) appliqués.

4 Claims, 3 Drawing Sheets

METHOD OF COATING SURFACES USING APPLIQUÉS OF CONSTANT GAUSSIAN CURVATURE

TECHNICAL FIELD

The present invention relates to a method of using appliqués having complex curvature themselves to coat surfaces of complex curvature, especially the exterior aerodynamic surfaces of airplanes.

BACKGROUND ART

Painting has long been the process of choice for applying coatings to surfaces of complex curvature because painting is controllable, reliable, easy, and versatile. The paint can include additives to give the surface desired physical properties. The painting process is well understood and produces quality coatings of uniform properties even when the surface includes complex curvature.

Unfortunately, painting is falling under closer environmental scrutiny because of the volatile solvents used to carry the pigments or the pigments themselves. Therefore, there is a need to replace painting with a process that has less environmental impact.

Furthermore, while painting is well defined, well understood, and common, painting remains an "art" where masters produce better products than novices or apprentices without necessarily being able to account for why or to teach others how.

Paint coatings also often lack the durability that quality-conscious customers demand ever more frequently. The surface must be treated and cleaned. The environment must be controlled during the coating application. Still, painted coatings are vulnerable to damage. Isolated damage may dictate large area repair, such as forcing the repainting of an entire panel.

Finally, spraying inherently wastes paint and is unpredictable because of the "art" involved with the application where improper application cannot be detected until the rework to correct a defect affects a large area even for a small glitch.

U.S. Pat. No. 4,986,496 by Marentic et al. for a drag reduction article describes conformable sheet material (a decal) with surface texturing for application to aircraft flow control surfaces to reduce aircraft drag. The material fits on curved surfaces without cracking, bubbles, or wrinkles because of the pliant properties of the basic carrier film. Marentic's decals are manufactured flat and are stretched to the intended simple curvature. Stretching can be problematic over time if the stretched material shrinks to expose a gap between adjacent decals where weather can attack the surface and the decal-surface interface. Streching problems limit the use of the Marentic decals to surfaces of slowly changing curvature. We incorporate this patent by reference.

SUMMARY OF THE INVENTION

The present invention is a method of using appliqués (i.e. decals) in place of painted coatings to form complete, bubble-free, wrinkleless coverings on surfaces of complex curvature. This method eliminates spraying of the paint pigment, and, therefore, is environmentally more sensitive.

The method includes the steps of:

(a) analyzing the Gaussian curvature of the surface to be covered to identify mapping lines of constant Gaussian curvature;

(b) identifying geodesic lines on the surface;

(c) analyzing the stretchiness needed to blend between appliqués of adjacent areas of different Gaussian curvature;

(d) producing appliqués for each Gaussian curvature using a family of molds;

(e) marking on the surface the lines of constant Gaussian curvature and connecting geodesics; and (f) applying and bonding the respective appliqués of matching Gaussian curvature to the surface to produce a complete, bubble-free, wrinkleless covering on the surface comparable to a conventional painted coating and while minimizing stretching of any appliqué to complete the coating.

The method recognizes that surfaces having the same Gaussian curvature can be mapped topologically to correspond. This fact means that, if you have a surface of Gaussian curvature 5 $ft^{-2}$, for example, that, instead of making a "splash" mold of the surface to use to make appliqués, all that you really need to do is to mold curvature 5 $ft^{-2}$ appliqués on a master curvature 5 $ft^{-2}$ mold, which, for example, might be a sphere. Appliqués from the master mold will fit bubble-free and wrinkleless on the actual surface.

When making precision coatings that are important for aerodynamic drag and other considerations on modem commercial and military aircraft, spray painting is a relatively unreliable process because it is difficult to control the spray head and spraying conditions to obtain precisely the same coating from article to article. One variable in this process that often is overlooked is the variance from article to article in the vehicle to which the paint is applied. Such variance is the natural consequence of the accumulation of tolerances (i.e., the accumulated variation that results from variations within allowable control limits for each part in the assembly). The appliqué method allows better control of the manufacture of the coating so that they will have the correct spectral properties by having the pigments and additives distributed properly throughout the appliqué. Difficulties in precisely manufacturing the coatings to obtain the desired properties can be overcome without the cost of scrapping an entire article because the coating is imperfect and inadequate or forcing costly stripping and reapplication of the coating.

Using appliqués also allows the replacement of small area repairs of precision coatings on aerospace surfaces by simply cutting away the damaged area and reinserting a suitable, fresh appliqué patch. Painting is troublesome in this situation because of the spray transition between the stripped area and the original coating. For example, an entire panel might be re-coated with conventional technology to fix a small area defect. Appliqués show promise for simply cutting out the defect and applying a matching fresh piece to repair the surface.

The appliqués usually come with single or double transfer protective paper to facilitate their application. One sheet of protective paper overlies the surface of the appliqué that will interface and bond with the article. This surface has an adhesive or inherent tackiness to allow it to stick to the metal or composite aircraft surface. The exposed surface may have similar protective paper to reinforce it and to protect it during the positioning and transfer with peeloff following proper positioning. Identifying information and instructions can be painted on the transfer papers to simplify application.

While the appliqués themselves may have the adhesive on their contact surface, a separate adhesive might be used. They may have sufficient inherent tack that an additional adhesive is unnecessary.

DETAILED DESCRIPTION OF A PREFERRED EMBODIMENT

Figure 1:
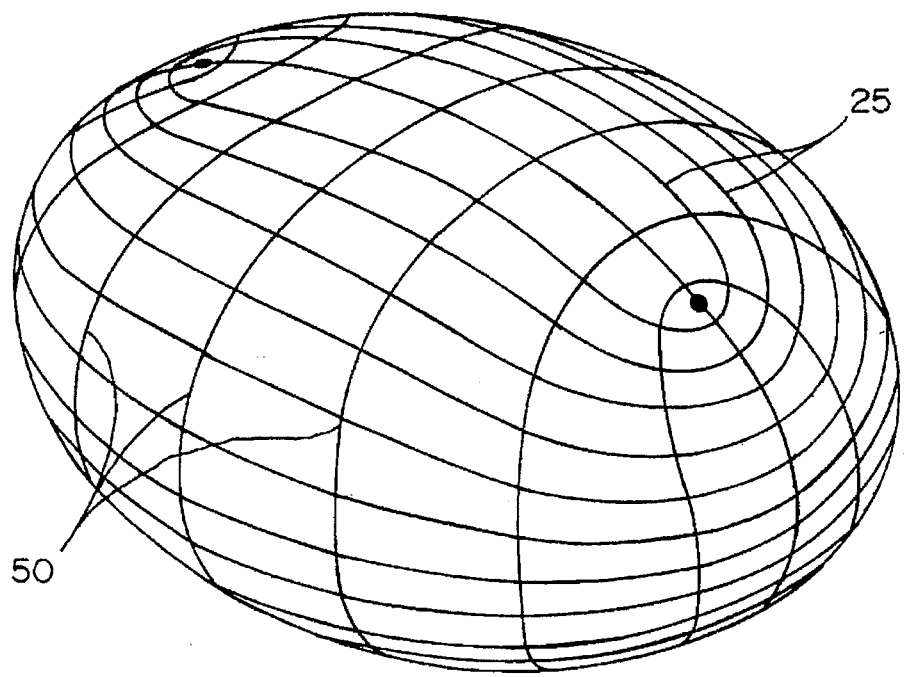
FIG. 1 schematically illustrates a surface having complex curvature showing lines of constant Gaussian curvature and geodesics.

The processes for making appliqués are well known so this description will provide only a limited overview. We incorporate by reference U.S. Pat. No. 4,986,496 which teaches the making of flat appliqués for covering flow control surfaces. These techniques are equally applicable to the present invention.

Flat material wrinkles or tears when applied to surfaces of complex curvature because the substrate is insufficiently compressible or stretchable. While darts or wedge removal, like the techniques used in tailoring clothes, does permit some contouring to complex curvatures, these tailoring techniques require complicated planning and skilled labor to produce a seamless, complete, bubble-free, and wrinkleless coating. Tailoring wastes material and does not deal with the unique irregularities of an actual article. That is, this tailoring approach presumes that each article of the same nominal type will have identical surface contours. In reality, with hardware as complex as aircraft, each aircraft has subtle but significant differences in their surface curvature and characteristics. These subtleties dictate individual tailoring rather than mass production.

The present invention involves an article by article evaluation of the surface curvature to identify lines of constant Gaussian curvature. This analysis is simplified to some degree if the article is designed to permit digital preassembly of solid models of the respective parts (as available for Boeing's 777 aircraft), but the curvatures can be identified as well using profilometry with conventional laser coordinate measuring apparatus, photogrammetry, or the like. Surface profiles permit identification of the actual curvature of the surface of interest rather than the theoretical curvature that the design data suggests. Profilometry likely is necessary for precise coatings. The equipment to plot the profile also is useful for the marking of lines of constant Gaussian curvature 25 and geodesics 50 on the surface of interest so that the respective appliqués can be laid down in a "color-by-number" process; the lines are useful as an identification aid. By "marking," we mean that the locale for each appliqué is identified. Such marking can be done with projection lights or with more traditional marking methods (chalklines, pencil, etc.).

Decals and appliqués normally are manufactured as flat material that is flexible and readily bent. We can apply material of this form to both flat surfaces and simple curved surfaces such as cylinders, cones, and rolling bends. More complicated surfaces involving compound curvature can only be covered if the material can be stretched or compressed to avoid wrinkling and tearing. If the material is not sufficiently elastic, cutting to permit overlapping, or wedge removal, as well as addition of darts, can be useful to extend coverage with a nominally flat appliqué or decal material. Such approaches can be time consuming, damaging to the applied material, and of questionable use if the material has any preferred orientation (as for example with riblets.)

An alternative approach to covering complex curved surfaces is to manufacture the covering material in a mold that matches the shape of the final surface to which the material will be applied. Though effective, this approach is undesirable because of the excessive need for tooling in cases where the surface is sufficiently complex as with the exterior skin of various aircraft. A separate splash mold might be required for each individual vehicle in the fleet because of article-to-article variation. Making and storing the molds would be prohibitively expensive.

Figure 3:
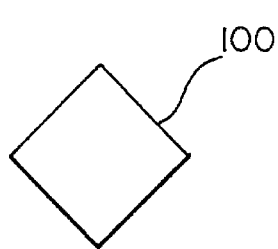
FIG. 3 is a schematic plan view of a typical appliqué.
Figure 4:
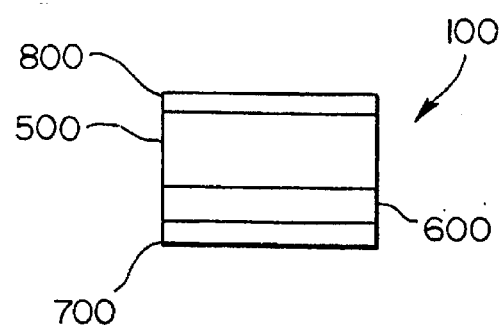
FIG. 4 is a schematic cross-section of the appliqué of FIG. 3 including protective paper on the contact surface and the exposed surface.

The present invention relates to a process which is intermediate between these two approaches. It involves the production a family of pre-molded decals and appliqués 100 (FIGS. 2 & 3) which are graded according to Gaussian curvature (GC). Presuming that a material is somewhat elastic, a particular decal would be suitable for surfaces within a certain range of Gaussian curvaure, i.e., a decal can be provided with a nominal curvature for certain curvature range. A given complex curved surface can be divided up into zones with corresponding Gaussian curvature ranges. Within each zone a single premolded decal can be used. As with surfaces suitable for covering with flat materials, each zone could involve a great variety of surface shapes subject only to the specified range of Gaussian curvature. This approach to molding would greatly reduce the need for special tooling since it is sufficient to use a standard set of spherical or symmetric saddle-shaped curved molds which are not specific to the final surface.

Gaussian curvature is a surface property which is a measure of compound curvature. This topic is normally discussed in texts on differential geometry and is not widely known in the engineering community. The concept is best understood by considering a mathematical plane which includes the surface normal vector at a particular point on a curved surface. The curve formed by the intersection of the plane with the curved surface is known as a normal curve. If the plane is spun around the axis defined by the surface normal, an infinite family of normal curves is generated. In some particular orientation, a maximum curvature will be obtained. A surprising result from differential geometry is that a normal curve with minimum curvature occurs when the plane is turned by 90 degrees. These two curvatures are known as principal curvatures, and can be used to describe the curvatures for other normal plane orientations via a simple formula. Each principal curvature can be expressed as the reciprocal of the local radius of curvature. The Gaussian curvature is simply the product of the two principal curvatures. Two elementary examples help to illustrate the concept. For a point on a cylindrical surface, one principal curvature is zero (that is, travel along the surface in the direction of the longitudinal axis is travel on a straight line) so the Gaussian curvature is zero. The Gaussian curvature is also zero for all other surfaces that can be formed by bending a flat material. Another simple example is a sphere. Clearly, the entire surface has a Gaussian curvature equal to the inverse square of the radius. Saddle-shaped surfaces will have a negative Gaussian curvature since the centers of curvature occur on different sides of the surface. In the most general case, the Gaussian curvature will vary across a surface. A good example of the more general case is a (football-like) prolate ellipsoid, which has its highest Gaussian curvature at its ends.

A decal or appliqué 100, 200, etc. with a particular Gaussian curvature (GC) can be formed on a symmetrical mold such as a sphere (or symmetric saddle). Provided that it is flexible, the appliqué or decal will fit without wrinkling onto any other surface with the same GC, even if it is bent and asymmetric. It is especially worth noting that the material can be applied in any desired orientation. As mentioned above, if the material is capable of stretching (or compressing) it should be suitable for coveting some range of GC values. It should also be possible to use an ellipsoidal mold to create transitional decals which have a gradient in GC.

This approach of using premolded appliqués and decals can be applied to aircraft markings on complex curved surfaces and offers an alternative to painting. While this approach may be valuable on commercial aircraft it is especially well suited to military aircraft where there is a need for rapid changes in camouflage and other low signature covering. This approach to appliqués and decals could be commercially valuable in many other areas such as automobiles, boats, and in a wide range of commercial products.

Figure 2:
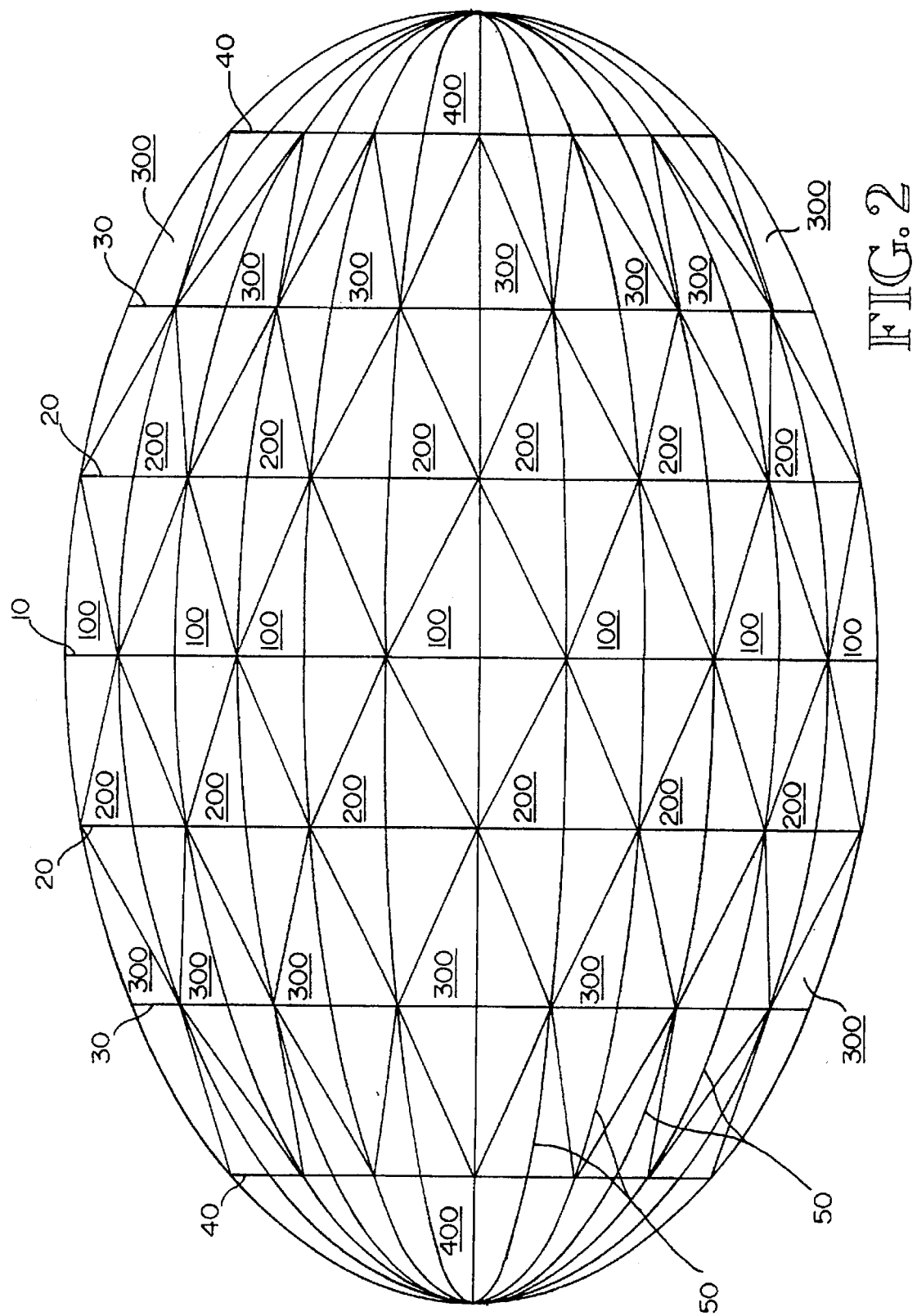
FIG. 2 illustrates ellipsoidal master mold used for making appliqués. The mold has lines of constant Gaussian curvature and geodesics.

FIG. 2 shows an ellipsoidal mold with lines of constant Gaussian curvature (10, 20, 30, and 40) in a symmetrical pattern running from center 10 to the ends. The lines are "straight" lines on the surface that extend parallel to one another in a transverse direction on the ellipsoidal mold. The lines correspond with global lines of latitude on common maps. FIG. 2 also shows geodesics 50 marked on the surface which extend longitudinally in graceful curves from pole to pole analogous to lines of longitude on global maps. Appliqués are centered on each cap line, and are diamond-shaped.

For purposes of this discussion, a geodesic is the shortest line extending on the surface between two points. On a sphere, a geodesic would be the "great circle" connecting the two points. A geodesic has a curvature vector equal to zero and has the principal normal coincide with the surface normal.

Appliqués 100 have nominal GC 10; appliqués 200 have nominal GC 20, and so forth. The ends 400 are relatively large cup or tulip shapes 400. The various appliqués fit together to cover the entire surface without wrinkles, gaps, or bubbles.

Figure 5:
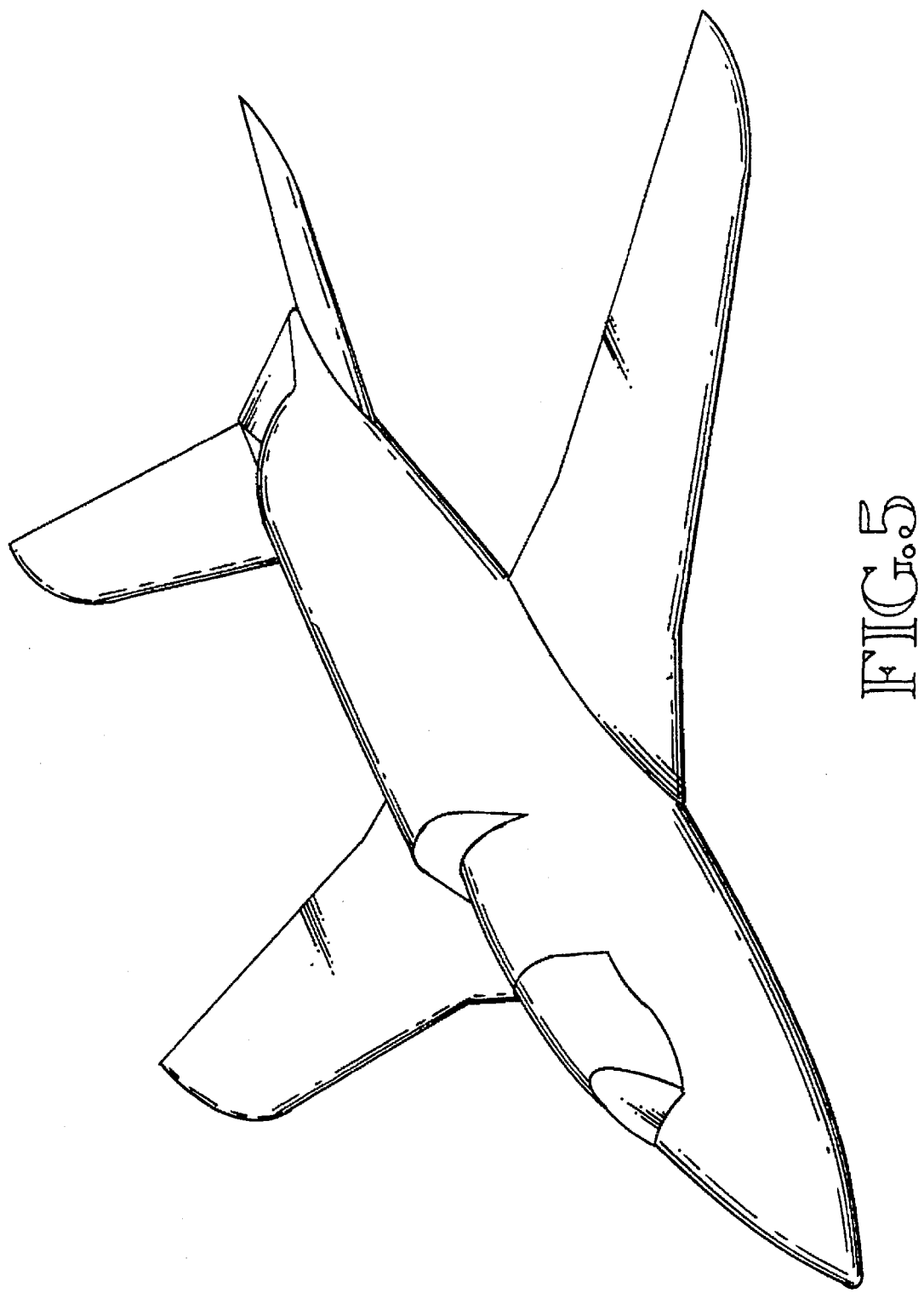
FIG. 5 is an aircraft which represents an article having complex curvature which we might coat with the appliqués of the present invention.

Appliqués can be made on the mold of FIG. 2 and transferred to aircraft, (FIG. 5), boats, trucks, or the like placing appliqué 100 on lines of corresponding GC 10 on the surface of interest. Other appliqués are picked and placed in similar fashion to cover the entire surface.

The size of the appliqués depends on the severity of the curvature. Smaller pieces are required if the gradient of the curvature is large, that. That is, where the GC changes over a short distance. Flat appliqués of GC 0, of course, can be used for cylindrical solids, flat surfaces, and any other large areas of GC 0.

A family of molds of differing size would supply appliqués of positive GC. A similar saddle mold family provide corresponding appliqués having negative GC's.

As described in U.S. Pat. No. 4,986,496, the appliqués can include surface patterns, and might include plasticizers, extenders, antioxidants, ultraviolet light stabilizers, dyes, pigments, emissivity agents (like silicon carbide), chopped or continuous fiber reinforcement, or the like, as is known for conventional appliqués.

The base material 500 for the appliqué is typically an organic resin matrix composite, particularly a polyurethane (i.e., cyanate ester), especially polyester and polyether urethanes; polyester; polyimide; or the like and appropriate adhesives, especially pressure-sensitive or heat curable adhesives 600, applied as a separate layer. The adhesives are commonly silicone-based materials or rubbery polymers or copolymers. The base material should be tough, durable, and resistant to weather. We prefer urethane.

Typical resins in the cyanate family are described in U.S. Pat. No. 5,134,421, which we incorporate by reference. Cyanate resins are characterized by the reactive functionality —OCN, but we use the term to include the thio cyanate cousins —SCN as well. Cyanate resins are prepared by reacting diols or polyols with a cyanogen halide, especially cyanogen chloride or bromide. The synthesis is well known and is described in U.S. Pat. Nos. 3,448,079; 3,553,244; and 3,740,348, for example; each of which is also incorporated by reference. The cyanate functionality self-polymerizes to form cyanate esters either with or without a suitable catalyst (such as tin octoate).

We might also use linear cyanate oligomers described in U.S. patent application Ser. No. 08/372,942, which we incorporate by reference. Such oligomers have one, two, or four reactive functionalities (like maleic or nadic) at each end of the polymer chain for crosslinking upon curing. In these oligomers, we convert diols to dicyanates (i.e., $N{\equiv}C{-}O{-}R_4{-}O{-}C{\equiv}N$, where $R_4$ is the residue of an organic diol) in the presence of cyanogen halide and connect phenol end cap monomers or corresponding cyanate end cap monomers using the same reaction.

Suitable catalysts for the cyanate resin systems of the subject invention are well known to those skilled in the art, and include the various transition metal carboxylates and naphthenates, for example zinc octoate, tin octoate, dibutyltindilaurate, cobalt naphthenate, and the like; tertiary amines such as benzyldimethylamine and N-methylmorpholine; imidazoles such as 2-methylimidazole; acetylacetonates such as iron (III) acetylacetonate; organic peroxides such as dicumylperoxide and benzoylperoxide; free radical generators such as azobisisobutyronitrile; organophoshines and organophosphonium salts such as hexyldiphenylphosphine, triphenylphosphine, trioctylphosphine, ethyltriphenylphosphonium iodide and ethyltriphenylphosphonium bromide; and metal complexes such as copper bis[8-hydroxyquinolate]. Combinations of these and other catalysts may also be used.

Virtually any diol can be converted to the cyanate analog and used in this synthesis. For high MWs, however, we prefer to use a soluble dicyanate, especially:

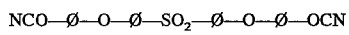

The thiocyanates exhibit essentially the same chemistry.

The appliqués usually come with single or double transfer protective paper to facilitate their application. One sheet of protective paper 700 overlies the surface of the appliqué that will interface and bond with the article. This surface has an adhesive or inherent tackiness to allow it to stick to the metal or composite aircraft surface. The exposed surface may have similar protective paper 800 to reinforce it and to protect it during the positioning and transfer with peeloff following proper positioning. Identifying information and instructions can be painted on the transfer papers to simplify application.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

I claim:

1. A method for applying a substantially wrinkle-less, bubble-free coating of appliqués to a surface having complex curvature; comprising the steps of:

(a) analyzing the curvature of the surface;

(b) plotting lines of constant Gaussian curvature on the surface;

(c) plotting geodesics on the surface to form a grid with the plotted lines of constant Gaussian curvature, the grid covering the entire surface;

(d) molding a plurality of differently curved appliqués, each appliqué being of substantially one nominal constant Gaussian curvature and grading each appliqué according to this nominal Gaussian curvature; and (e) coating the surface by selecting and bonding appliqués of nominal Gaussian curvature corresponding to each of the constant Gaussian curvatures plotted on the surface using the grid as an identification aid such that the appliqués together cover the surface with a bubble-free, wrinkleless, complete coating.

2. The method of claim 1 wherein the surface is a complexly curved portion of an airplane.

3. The method of claim 1 wherein the appliqués are molded from an organic matrix resin selected from the group consisting of polyurethane, polyester, and polyimide, optionally including an adhesive for connecting the appliqué to the surface and optionally including an effective amount of at least one additive selected from the group consisting of plasticizers, extenders, antioxidants, ultraviolet light stabilizers, dyes, pigments, emissivity agents, and fiber reinforcement.

4. The method for coating a surface completely with appliqués, the surface having complex curvature, wherein the surface has at least two different Gaussian curvatures, comprising the steps of:

(a) plotting lines of constant Gaussian curvature on the surface at selected intervals and plotting geodesics on the surface such that the lines of constant Gaussian curvature together with the geodesics form a grid over the entire surface;

(b) molding a family of appliqués of different Gaussian curvatures, the appliqués comprising curved shapes molded from an organic matrix resin selected from the group consisting of polyurethanes, polyesters, and polyimides and, optionally, an effective amount of at least one additive selected from the group consisting of plasticizers, extenders, antioxidants, ultraviolet light stabilizers, dyes, pigments, emissivity agents, and fiber reinforcement, and each appliqué having only one nominal constant Gaussian curvature;

(c) applying and bonding appliqués of a first plotted Gaussian curvature to the surface along plotted lines corresponding to the same nominal Gaussian curvature as the appliqué using the grid as an identification aid; and (d) applying and bonding appliqués of at least a second plotted Gaussian curvature along plotted lines corresponding to the same nominal Gaussian curvature as the appliqué to provide a smooth, wrinkleless coating completely covering the surface.

* * * * *